United States Patent [19]

Schroder

[11] Patent Number: 4,619,607
[45] Date of Patent: Oct. 28, 1986

[54] BAKING OVEN HAVING TURNTABLE DRIVEN FROM AN EXTERNAL MOTOR WHOSE DRIVE SHAFT IS COUPLED VIA A SEAL TO AN INTERNAL CHAIN

[75] Inventor: Helmut Schroder, Bietigheim-Bissingen, Fed. Rep. of Germany

[73] Assignee: Werner & Pfleiderer, Stuttgart, Fed. Rep. of Germany

[21] Appl. No.: 770,659

[22] Filed: Aug. 28, 1985

[30] Foreign Application Priority Data

Aug. 28, 1984 [DE] Fed. Rep. of Germany ....... 3431505

[51] Int. Cl.$^4$ ............................ F27B 3/18; F27B 9/16; F26B 11/00; A47J 37/10
[52] U.S. Cl. ...................................... 432/162; 34/187; 99/443 R; 126/41 A; 312/236; 432/142; 432/244
[58] Field of Search .............. 432/107, 108, 138, 142, 432/162, 244; 126/41 A; 312/236; 99/443 R; 34/187

[56] References Cited

U.S. PATENT DOCUMENTS

| | | | |
|---|---|---|---|
| 2,443,244 | 6/1948 | Hess | 432/138 |
| 3,273,489 | 9/1966 | Wilson | 99/443 R |
| 3,412,695 | 11/1968 | Andersson | 34/187 X |
| 3,425,364 | 2/1969 | Martin, Jr. | 432/142 |
| 4,375,354 | 3/1983 | Henriksson | 432/138 |
| 4,470,805 | 9/1984 | Gollan | 432/138 |
| 4,523,070 | 6/1985 | Jorgensen et al. | 99/443 R |

*Primary Examiner*—John J. Camby
*Attorney, Agent, or Firm*—Roberts, Spiecens & Cohen

[57] ABSTRACT

A baking oven heated by circulation of hot-air comprising a baking compartment with a turntable at the bottom thereof adapted for receiving a multiple rack cart which carries the material to be baked and which is rotated around a vertical axis. The turntable is provided with a drive gear therebelow coupled to a chain which in turn is coupled to a pinion on a vertical shaft extending outside the baking compartment and driven by a drive motor. A chain box surrounds the chain and includes a portion extending outside the baking compartment which is air-tight to prevent escape of vapor thereat from the baking compartment. The vertical shaft extends into the air-tight portion of the chain box via a seal.

11 Claims, 3 Drawing Figures

4,619,607

BAKING OVEN HAVING TURNTABLE DRIVEN FROM AN EXTERNAL MOTOR WHOSE DRIVE SHAFT IS COUPLED VIA A SEAL TO AN INTERNAL CHAIN

FIELD OF THE INVENTION

The invention relates to a baking oven which is heated by circulation of hot air and which has a baking compartment with a turntable at the bottom thereof adapted for receiving a multiple rack cart which carries the material to be baked and which is rotated around a vertical axis. The turntable is provided with a drive gear therebelow coupled to a chain which is driven by a drive motor.

BACKGROUND AND PRIOR ART

Baking ovens of the above type are disclosed in German Published Application OS No. 14 32 916 and U.S. Pat. No. 3,412,695. In these baking ovens, the chain of the drive of the turntable extends, without a seal, from the baking compartment and is wrapped around the freely exposed pinion of the drive shaft.

The known embodiments of the turntable drive do not satisfy the requirements of baking ovens of the aforementioned type, also known as baking cabinets.

In this regard, it is necessary for a baking cabinet, in the same way as for all baking ovens, for the baking compartment to be tightly closed off from the surrounding atmosphere so that no vapor, condensate or lubricant can pass into the baking compartment. The possibility of emergence of vapor, etc. is, however, present in the aforementioned known baking cabinets, in which an ordinary opening is provided, for the passage of the chain, in the wall surrounding the baking compartment. The emergence of vapor at this location can furthermore not be prevented by arranging the passage of the chain below the turntable, since the vapor passes through the gap required for movement between the periphery of the turntable and the surrounding false bottom and also into the space located below the turntable. This space represents a part of the baking compartment insofar as there prevails within it substantially the same atmospheric conditions as in the rest of the baking compartment within which is located the material to be baked.

The vapor escaping at the location of passage of the chain constitutes a loss of energy and thus reduces the economy of the baking process. Condensation of the vapor on the walls and equipment of the baking compartment promotes the formation of mold thereat. Furthermore, vapor can penetrate from the opening for the passage of the chain into the space filled with insulating material between the wall of the baking compartment and the outer covering of the baking oven, resulting in damage by corrosion and impairment of the insulating action. Finally, the region surrounding the drive shaft becomes considerably filthy as a result of the required lubrication of the chain.

SUMMARY OF THE INVENTION

An object of the present invention is to provide means to prevent the escape of vapor from the baking compartment of a baking oven of the described type as well as dirtying as a result of the chain drive for the turntable, while retaining the customary minimal structural height of the drive for the turntable.

In order to satisfy the above and further objects, the invention comprises a chain box surrounding the chain and including a portion extending outside the baking compartment, said portion being air-tight to prevent escape of vapor thereat from the baking compartment. A vertical shaft of a motor disposed outside the baking compartment extends into said portion of the chain box and is sealed thereat.

The invention is based on the recognition that the passage of a chain through a wall cannot be kept completely vapor-tight during operation since vapor is continuously conducted from the baking compartment within the spaces present in the links of the chain, while, on the other hand, the sealing of the passage of a shaft is possible in simple manner by ordinary structural parts.

By the construction in accordance with the invention sealing of the chain is unnecessary since it is contained completely within a chain box, the portion of which located outside the baking compartment is vapor-tight and thus becomes a part of the baking compartment. Instead of sealing the chain, it is now merely necessary to seal the vertical shaft at its entrance into the chain box, which can be effected with an ordinary commercial packing.

In this way, complete sealing against the escape of vapor is obtained with simple structural means without requiring any increase in the structural height of the turntable drive. This is important since the introduction and removal of the multiple-rack cart is facilitated by the arrangement of the turntable at the lowest height above the bottom of the baking compartment. Additionally, no dirtying can be caused by the chain lubricant, since the chain is surrounded by the chain box over its entire length.

By providing heat insulation in the portion of the chain which is outside the baking compartment heat losses from the chain box can be virtually eliminated. At the same time, the formation of condensate within the chain box is prevented.

According to another feature of the invention, the chain box has a cover below a gap between the turntable and the wall of a cutout in a false bottom of the oven to prevent baking residues from falling through the gap onto the chain to impair the drive.

DETAILED DESCRIPTION OF THE PREFERRED EMBODIMENT

Figure 1:
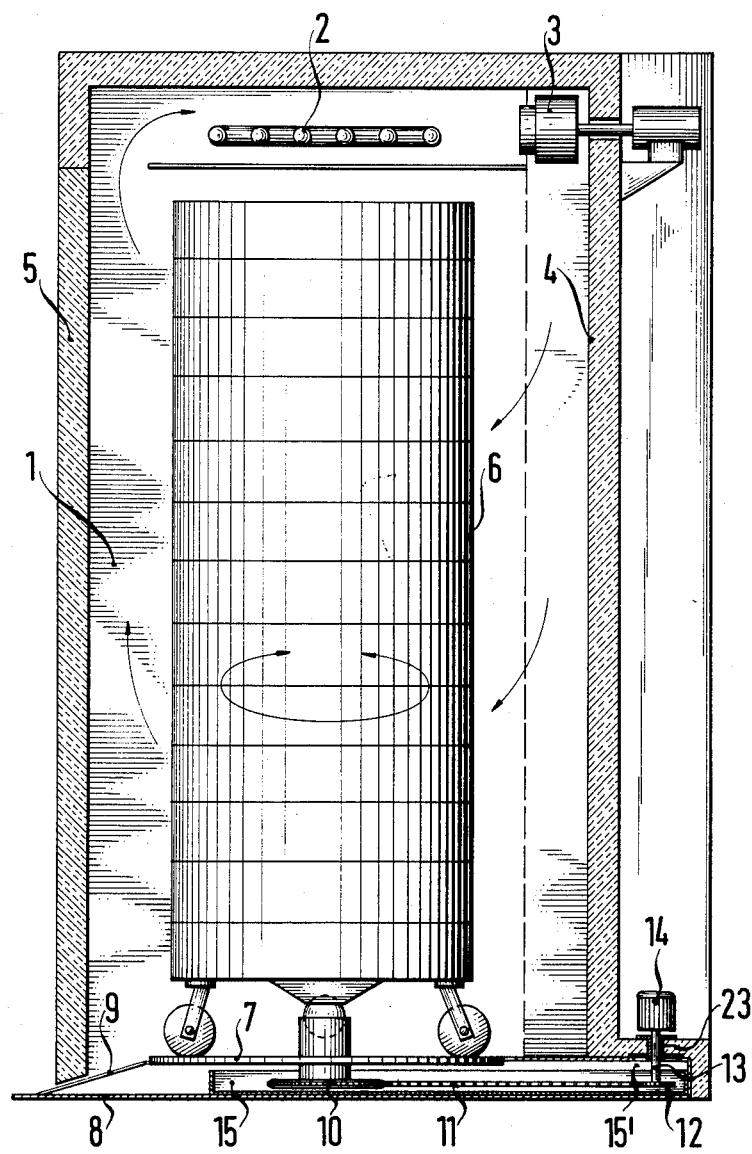
FIG. 1 is a schematic vertical section through a baking oven showing one embodiment of the invention.

In FIG. 1 there is seen a baking oven employing hot-air circulation heating. More particularly, the air present in a baking compartment 1 of the oven is heated by a heater 2 comprising, for example, a plurality of electric heating rods and the heated air is circulated by a fan 3, in a circulation path indicated by the arrows. The baking compartment 1 is enclosed by a housing 4 which has heat insulation on its outer surface. A door 5 is provided on one side of the housing of the baking compartment for introducing into the oven a multi-rack cart 6 which carries the material to be baked and which is rotated around a vertical axis during the baking. For this purpose, the cart 6 is placed on a turntable 7 which is mounted on the bottom 8 of the baking compartment. The bottom 8 is formed by a steel plate which tightly closes off the bottom of the baking compartment 1. At the level of the turntable 7 there is provided a false bottom 9 which is shaped, in the region of the door 5, as a ramp for the introduction and removal of the cart 6. The turntable 7 carries therebelow a gear 10 around which a chain 11 is engaged and extends to a pinion 12 which is mounted on a vertical shaft 13 located outside the baking compartment 1. The shaft 13 is drivingly coupled in conventional manner to a drive motor 14 located at the rear of the baking compartment opposite door 5. A chain box 15 surrounds the chain 11 over its entire periphery and extends from the gear 10 to the pinion 12.

Figure 2:
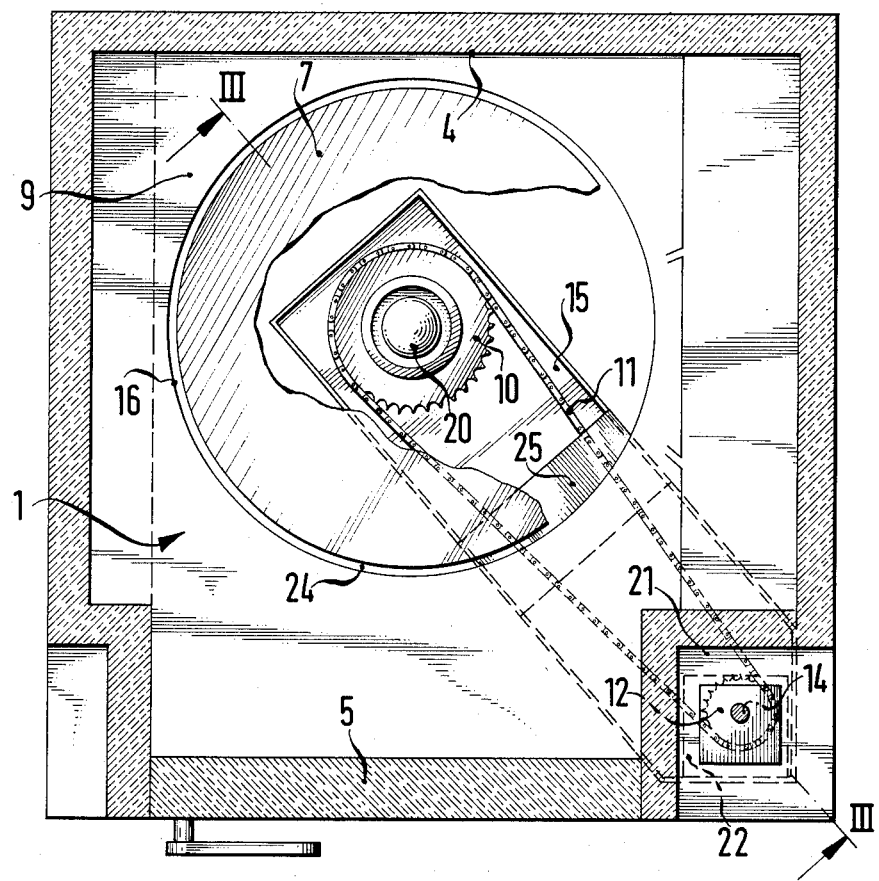
FIG. 2 is a horizontal sectional view, on an enlarged scale, through the baking oven in FIG. 1, according to a modified version in which the drive motor for the chain is positioned at the front.
Figure 3:
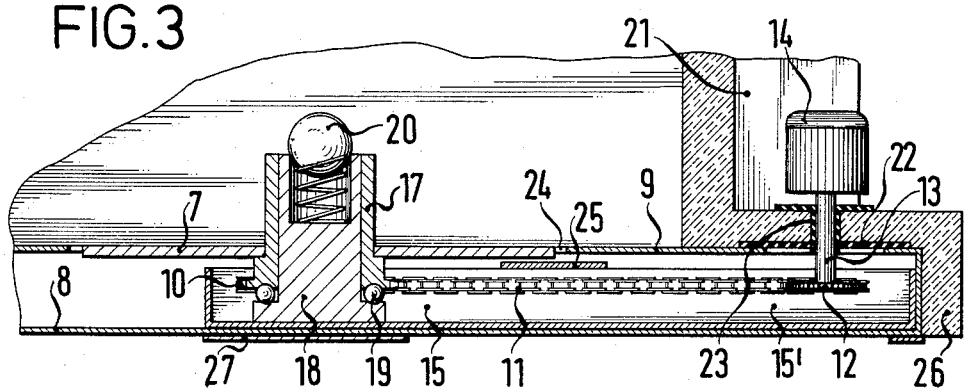
FIG. 3 is a sectional view taken along line III—III in FIG. 2.

Details of the baking oven will next be described with reference to FIGS. 2 and 3.

The turntable 7 is located within a cutout 16 in the false bottom 9 and is mounted in readily removable manner on a mounting bushing 17. The gear 10 is integrally formed on the periphery of mounting bushing 17. The mounting bushing 17 is rotatable around a central bearing 18 and rests on a thrust bearing 19. A ball 20, serving for the centering of the cart 6, is mounted under spring action in an axial bore within the central bearing 18.

The vertical shaft 13 together with the drive motor 14 are located in an indentation or recess 21 at the right front corner of the housing 4 adjacent door 5 for ease of access. The chain box 15 extends on the bottom of the baking oven. The chain box 15 has a U-shaped cross section and is welded in airtight manner to the housing 4. At the portion 15' of the chain box, which is located outside the baking compartment, the chain box 15 is provided with a cover 22 also fastened in air-tight manner to the housing 4 through which the vertical shaft 13 enters the chain box. At this point there is provided on the shaft 13 a seal 23 which is constructed in conventional manner as a packing, sliding bushing or the like.

The cover 22 can be removably secured and it is optionally constructed as a support for the drive motor 14.

Within the baking compartment, the chain box 15 is open at its top since it is covered from above by the turntable 7 and the false bottom 9. A cover 25 is provided only in the region of the gap 24 between the turntable 7 and the cutout 16 in the false bottom.

In order to avoid heat losses, the portion 15' of the chain box which is located outside the baking compartment 1 is provided with heat insulation 26 on its exterior in the same manner as is the housing 4. For the same purpose, the bottom 8 of the baking compartment is spaced by spacer disks 27 from the foundation and thus insulated against loss of heat.

Although the invention has been described in relation to a specific embodiment thereof, it will become apparent to those skilled in the art that numerous modifications and variations can be made within the scope and spirit of the invention as defined in the attached claims.

What is claimed is:

1. In a baking oven heated by circulation of hot-air and having a baking compartment with a turntable above a bottom thereof adapted for receiving a multiple rack cart which carries the material to be baked and which is rotated around a vertical axis, the oven having a relatively narrow space below the turntable above said bottom, the turntable being provided with a drive gear therebelow disposed horizontally in said space and coupled to a horizontal chain which in turn is coupled to a pinion on a vertical shaft extending outside the baking compartment and driven by a drive motor, the improvement comprising a chain box surrounding the chain and including a portion extending outside said baking compartment, said chain box extending in said narrow space around said drive gear and said chain, means for rendering said portion of said chain box which extends outside the baking compartment air-tight to prevent escape of vapor thereat from the baking compartment to the ambient atmosphere, said vertical shaft extending into said portion of said chain box which is air-tight, and means sealing said vertical shaft and said portion of the chain box which is air-tight such that the chain is sealingly enclosed, partially in the space beneath the baking compartment and partially in the air-tight portion of the chain box extending outside the baking compartment.

2. The improvement as claimed in claim 1 comprising heat insulation means on said portion of the chain box outside said baking compartment.

3. The improvement as claimed in claim 1 wherein the oven includes a housing defining the baking comparment, said housing having a notch in which said drive motor and vertical sahft are disposed.

4. The improvement as claim in claim 3 wherein said housing is of rectangular outline and has front corners, said notch being at one of said front corners.

5. The improvement as claimed in claim 1 wherein said baking compartment includes a false bottom member having a cut out in which said turntable is received and forms a gap with the false bottom member, said chain box including a cover beneath said gap.

6. The improvement as claimed in claim 1 wherein said means sealing said vertical shaft and said portion of the chain box comprises a packing.

7. The improvement as claimed in claim 1 wherein said drive motor is disposed outside said baking compartment.

8. The improvement as claimed in claim 1 comprising an inclined ramp extending from the level of the turntable to said bottom of the baking compartment.

9. The improvement as claimed in claim 8 wherein the baking compartment includes an access door at said ramp for introduction and removal of said cart.

10. The improvement as claimed in claim 9 wherein the chain box includes a base secured to said bottom and an upstanding wall on said base surrounding said drive gear and said chain.

11. The improvement as claimed in claim 5 wherein the chain box includes a base secured to said bottom and an upstanding wall on said base surrounding said drive gear and said chain, said cover being on said side walls to cover the chain box and the chain therein beneath the gap.

* * * * *